No. 649,876. Patented May 15, 1900.
W. S. RICHARDSON.
HOOK AND EYE.
(Application filed Aug. 15, 1896.)
(No Model.)

WITNESSES
J. M. Dolan.
Leo. C. Walsh

INVENTOR
Wm. S. Richardson
by his attys
Clarke & Raymond

UNITED STATES PATENT OFFICE.

WILLIAM S. RICHARDSON, OF BOSTON, MASSACHUSETTS, ASSIGNOR TO THE BALL AND SOCKET FASTENER COMPANY, OF SAME PLACE AND NASHUA, NEW HAMPSHIRE.

HOOK AND EYE.

SPECIFICATION forming part of Letters Patent No. 649,876, dated May 15, 1900.

Application filed August 15, 1896. Serial No. 602,918. (No model.)

*To all whom it may concern:*

Be it known that I, WILLIAM S. RICHARDSON, a citizen of the United States, residing at Boston, in the county of Suffolk and State of Massachusetts, have invented a new and useful Improvement in Hooks and Eyes, of which the following is a full, clear, and exact description, reference being had to the accompanying drawings, forming a part of this specification, in explaining its nature.

The invention relates to the herein-described improvement in hooks and eyes, the eye preferably being made of wire and having extending at a right angle to the plane of its back a socket-entrance having yielding sides and also having extending from the forward end of the socket and substantially parallel with the back a section which unites the sides of the socket and increases their resiliency. The hook is formed with an enlargement upon one or both sides between its end and the bend, and the enlargement or enlargements are slightly wider than the width of the socket, whereby as the hook is inserted into the eye the socket is caused to be opened and to then spring back upon the hook above the enlargement or enlargements, while the bend of the hook closes upon the outer section of the socket, which, in effect, forms a bar.

Figure 1:
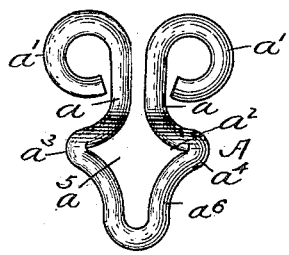
Figure 2:
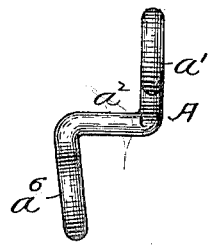
Figure 3:
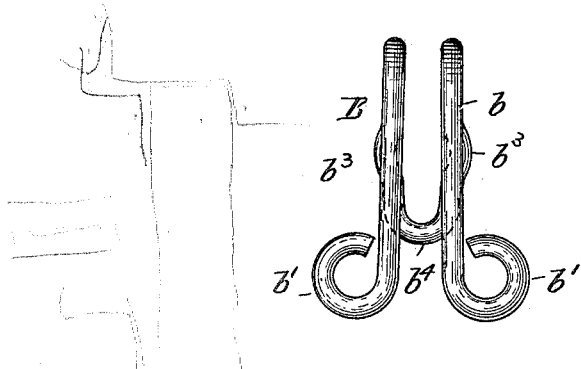
Figure 4:
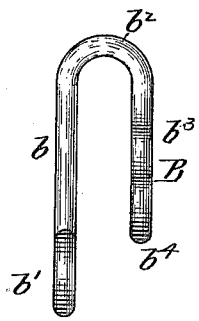
Figure 5:
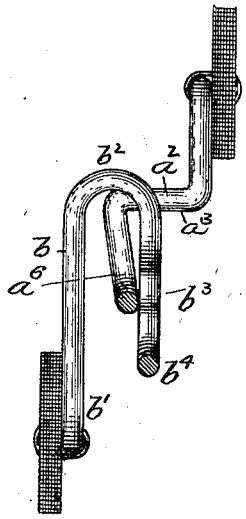

Figure 1 represents a front view of my improved eye; Fig. 2, a side view of the same. Fig. 3 is a rear view of my improved hook. Fig. 4 is a side view of the same. Fig. 5 shows the hook and eye in engagement with each other.

A represents the eye, and B the hook, each preferably made of wire, although not necessarily so. The eye A has the back section $a$, provided with attaching-eyes $a'$, the socket $a^2$, bent, preferably, at a right angle to the back, having the yielding sides $a^3$ $a^4$ and the socket-entrance $a^5$ and the extension $a^6$ from its forward end, which provides the sides $a^3$ $a^4$ with increased resiliency. The two sides come together or very nearly together at the upper end of the extension $a^6$ and form a bar upon which the bend of the hook rests when the hook is in engagement with the eye. The hook B has the back $b$, provided with eyes $b'$, the bend $b^2$, and the enlargements $b^3$ between the bend and the end $b^4$ of the beak of the hook. The enlargements are formed, preferably, by bending outward the wire of which the hook is made at the points indicated, and the hook at this place is somewhat wider than the width of the socket-entrance $a^5$, so that upon the insertion of the hook into the eye the enlargements cause the socket to be opened slightly and to then close upon the hook between the enlargements and the bend $b^3$, the hook at the bend then resting against the bar formed by the sides $a^3$ $a^4$ of the socket-entrance where they come together.

It will be seen that the arms forming the back and bend of the hook are separated from each other and do not anywhere touch each other either at the back or bend or in the hook, and that this provides the enlargements with a yielding action or movement inward or toward each other when they are pressed toward each other, as they are in the act of entering and passing the socket-entrance of the eye either upon the insertion of the hook or the withdrawal, and that this renders the action of the hooking and unhooking softer or more velvety than it otherwise would be.

A hook and eye of this construction is desirable because of the ease with which the hook may find and enter the eye, the eye being set out from its support, and also from the locking of the hook to the eye, which prevents too easy unhooking.

Having thus fully described my invention, I claim and desire to secure by Letters Patent of the United States—

1. A hook-and-eye fastening for garments having an eye member provided with back sections for securing said eye to the garment, hook-engaging arms extending from said back sections at substantially right angles thereto to form a hook-receiving opening, and a hook member provided with enlargements on its hook portion or beak slightly larger than said hook-receiving opening, said hook member being adapted to spring into said hook-receiving opening and be held against accidental disengagement from said eye member.

2. An eye member for hook-and-eye fastenings having back sections for securing said eye to a garment, and yielding hook-engaging arms extending from said back sections at substantially right angles thereto to form a hook-receiving opening.

3. An eye member for hook-and-eye fastenings having back sections for securing said eye to a garment, hook-engaging arms extending from said back sections at substantially right angles thereto, to form a hook-receiving opening, and a forward section parallel with said back sections and united at its forward end to close said hook-receiving opening.

4. A hook-and-eye fastening for garments having an eye member provided with back sections, yielding hook-engaging arms extending from said back sections at substantially right angles thereto to form a hook-receiving eye, a forward section parallel with said back sections and closing the hook-receiving opening, and a hook member adapted to enter said hook-receiving opening having yielding enlargements on one or both sides of its hook portion or beak.

5. A hook-and-eye fastening for garments having back sections, arms extending from said back sections at substantially right angles thereto to form a yielding hook-receiving opening, and a hook member having enlargements slightly larger than said hook-receiving opening formed on its hook portion or beak.

WILLIAM S. RICHARDSON.

Witnesses:
F. F. RAYMOND, 2d,
J. M. DOLAN.